United States Patent
Bromell et al.

(10) Patent No.: US 9,544,826 B2
(45) Date of Patent: Jan. 10, 2017

(54) NETWORK ELEMENTS, WIRELESS COMMUNICATION SYSTEM AND METHODS THEREFOR

(71) Applicant: IP. Access Limited, Cambridge (GB)

(72) Inventors: John Yearsley Bromell, Essex (GB); James Edward Brereton Harrow, Cambridgeshire (GB)

(73) Assignee: IP.Access Limited, Cambridge (GB)

( * ) Notice: Subject to any disclaimer, the term of this patent is extended or adjusted under 35 U.S.C. 154(b) by 0 days.

(21) Appl. No.: 14/436,600

(22) PCT Filed: Oct. 4, 2013

(86) PCT No.: PCT/EP2013/070695
§ 371 (c)(1),
(2) Date: Apr. 17, 2015

(87) PCT Pub. No.: WO2014/060222
PCT Pub. Date: Apr. 24, 2014

(65) Prior Publication Data
US 2015/0289181 A1    Oct. 8, 2015

(30) Foreign Application Priority Data
Oct. 18, 2012 (GB) .................................. 1218710.0

(51) Int. Cl.
*H04W 36/14* (2009.01)
*H04W 24/10* (2009.01)
(Continued)

(52) U.S. Cl.
CPC ............. *H04W 36/14* (2013.01); *H04W 16/32* (2013.01); *H04W 24/10* (2013.01);
(Continued)

(58) Field of Classification Search
None
See application file for complete search history.

(56) References Cited

U.S. PATENT DOCUMENTS

| 2005/0048974 A1 | 3/2005 | Kim | |
|---|---|---|---|
| 2012/0294184 A1* | 11/2012 | Jung | ...................... H04W 24/10 370/252 |

(Continued)

FOREIGN PATENT DOCUMENTS

| GB | 2472595 A | 2/2011 |
|---|---|---|
| GB | 2480432 A | 11/2011 |

OTHER PUBLICATIONS

New POSTCOM: "On the detection of inter-RAT ping-pings", 3GPP DRAFT; R3-120633 on the Detection of Inter-RAT Ping-Pings, 3rd Generation Partnership Project 93GPP0, Mobile Competence Centre; 650, Route Des Luciokes; F-0621 Sophia-Antipolis Cedex; France, vol. RAN WG3, No. San Jose Del Cabo, Mexico; 20120326-20120330; Apr. 2, 2012 (Apr. 2, 2012), XP050668990, Retrieved from the Internet: URL: Http://www.3gpp.org/ftp/tsg_ran/WG3_lu/TSGR3_75bis/Docs/ [retrieved on Apr. 2, 2012] the whole document.

(Continued)

*Primary Examiner* — Diane Mizrahi
(74) *Attorney, Agent, or Firm* — Optimus Patents US, LLC

(57) ABSTRACT

The likelihood of dropping a call while a User Equipment (112) is moving quickly from a macrcell (C) into a small cell (B) and then out again because there is insufficient time to set up measurements in the User Equipment, is mitigated by forcing the User Equipment to enter compressed mode as soon as it enters the small cell (B). By immediately forcing the User Equipment to enter compressed mode rather than waiting until it reports that the serving cell is getting weak, it stands a better chance of finding inter-frequency (ie.

(Continued)

non-co-channel) and inter-RAT (ie. different radio access technologies) neighboring cells ready to hand out to.

13 Claims, 4 Drawing Sheets

(51) Int. Cl.
  *H04W 36/00* (2009.01)
  *H04W 36/24* (2009.01)
  *H04W 16/32* (2009.01)
  *H04W 84/04* (2009.01)
  *H04W 88/12* (2009.01)
(52) U.S. Cl.
  CPC ... *H04W 36/0061* (2013.01); *H04W 36/0088* (2013.01); *H04W 36/24* (2013.01); *H04W 36/245* (2013.01); *H04W 84/042* (2013.01); *H04W 88/12* (2013.01)

(56) References Cited

U.S. PATENT DOCUMENTS

2015/0009854 A1\* 1/2015 Jung ..................... H04W 24/10
  370/252
2015/0382226 A1\* 12/2015 Jung ..................... H04W 24/10
  370/252

OTHER PUBLICATIONS

New POSTCOM: "Enhanced detection of 3G-LTE-3G ping-ping", 3GPP DRAFT; R3-1121115 Enhanced Detection for 3G_LTE-3G pp, 3rd Generation Parntership Project (3GPP), Mobile Competence Centre; 650, Route Des Lucioles; F-06921 Sophia-Antipolis Cedex; France, vol. RAN WG3, No. Prague, Czech Republic; 20120521-20120525, May 12, 2012 (May 12, 2012), XP050611226, [retrieved on May 12, 2012] the whole document.
"3rd Generation Partnership Project; Technical Specification Group Radio Access Network; Physical layer; Measuremetns (FDD) (release 11)", 3GPP Standard; 3GPP TS 25.215, 3rd Generation Partnership Project 93GPP), Mobile Competence Centre; 650, Route Des Lucioles; F-06921 Sophioa-Antipolis Cedec; France, vol. RAN WG1, No. V11.0.0, Dec. 19, 2011 (Dec. 19, 2011), pp. 1-24, XP05055017, [retrieved on Dec. 19, 2011] paragraph [06.1].
New POSTCOM: "Measurement framework support for detection of short stay problem", 3GPP DRAFT; R3-103590_MEASUREMENT Framework Support for Detectiion of Short Stay Problem, 3rd Generation Partnership Project (3GPP), Mobile Competence Centre; 650, Route Des Lucioles; F-06921 Sophia-Antipolis Cedex; France, vol. RAN WG3, No. Jacksonville 20101115-20101119, Nov. 16, 2010 (Nov. 16, 2010), XP050610370, [Retrieved on Nov. 16, 2010] the whole document.

\* cited by examiner

NETWORK ELEMENTS, WIRELESS COMMUNICATION SYSTEM AND METHODS THEREFOR

FIELD OF THE INVENTION

The field of this invention relates to network elements, a wireless communication system and methods for supporting a handover of communications between wireless communication cells.

BACKGROUND

Wireless communication systems, such as the 3rd Generation (3G) of mobile telephone standards and technology, are well known. An example of such 3G standards and technology is the Universal Mobile Telecommunications System (UMTS™), developed by the 3rd Generation Partnership Project (3GPP™) (www.3gpp.org). The 3rd generation of wireless communications has generally been developed to support macro-cell mobile phone communications. Such macro cells utilize high power base stations (NodeBs in 3GPP parlance) to communicate with wireless communication units within a relatively large geographical coverage area. Typically, wireless communication units, or User Equipment (UEs) as they are often referred to in 3G parlance, communicate with a Core Network (CN) of the 3G wireless communication system via a Radio Network Subsystem (RNS). A wireless communication system typically comprises a plurality of radio network subsystems, each radio network subsystem comprising one or more cells to which UEs may attach, and thereby connect to the network. Each macro-cellular RNS further comprises a controller, in a form of a Radio Network Controller (RNC), operably coupled to the one or more Node Bs, via a so-called Iub interface.

The second generation wireless communication system (2G), also known as GSM, is a well-established cellular, wireless communications technology whereby "base transceiver stations" (equivalent to the Node B's of the 3G system) and "mobile stations" (user equipment) can transmit and receive voice and packet data. Several base transceiver stations are controlled by a Base Station Controller (BSC), equivalent to the RNC of 3G systems.

Communications systems and networks are developing towards a broadband and mobile system. The 3rd Generation Partnership Project has proposed a Long Term Evolution (LTE) solution, namely, an Evolved Universal Mobile Telecommunication System Territorial Radio Access Network, (E-UTRAN), for a mobile access network, and a System Architecture Evolution (SAE) solution, namely, an Evolved Packet Core (EPC), for a mobile core network. User Equipment (UE) can access a CS domain core network through a 2G/3GRAN such as the (Enhanced Data Rate for GSM Evolution, EDGE) Radio Access Network (GERAN) or a Universal Mobile Telecommunication System Terrestrial Radio Access Network (UTRAN), and access the EPC through the E-UTRAN.

Some User Equipments have the capability to communicate with networks of differing radio access technologies. For example, a user equipment may be capable of operating within a UTRAN and within an E-UTRAN.

Lower power (and therefore smaller coverage area) cells are a recent development within the field of wireless cellular communication systems. Such small cells are effectively communication coverage areas supported by low power base stations. The terms "picocell" and "femtocell" are often used to mean a cell with a small coverage area, with the term femtocell being more commonly used with reference to residential small cells. Small cells are often deployed with minimum RF (radio frequency) planning and those operating in consumers' homes are often installed in an ad hoc fashion. The low power base stations which support small cells are referred to as Access Points (AP's) with the term Home Node B (HNB's) or Evolved Node Node B (eHNB) identifying femtocell Access Points. Each small-cell is supported by a single Access Point. These small cells are intended to augment the wide area macro network and support communications to multiple User Equipment devices in a restricted, for example, indoor environment. An additional benefit of small cells is that they can offload traffic from the macro network, thereby freeing up valuable macro network resources. An HNB is an Access Point that provides a wireless interface for user equipment connectivity. It provides a radio access network connectivity to a user equipment (UE) using the so-called Iuh interface to a network Access Controller, also known as a Home Node B Gateway (HNB-GW). One Access Controller (AC) can provide network connectivity of several HNB's to a core network.

Typical applications for such Access Points include, by way of example, residential and commercial locations, communication 'hotspots', etc., whereby Access Points can be connected to a core network via, for example, the Internet using a broadband connection or the like. In this manner, small cells can be provided in a simple, scalable deployment in specific in-building locations where, for example, network congestion or poor coverage at the macro-cell level may be problematic.

Thus, an AP is a scalable, multi-channel, two-way communication device that may be provided within, say, residential and commercial (e.g. office) locations, 'hotspots' etc, to extend or improve upon network coverage within those locations. Although there are no standard criteria for the functional components of an AP, an example of a typical AP for use within a 3GPP 3G system may comprise Node-B functionality and some aspects of Radio Network Controller (RNC) functionality as specified in 3GPP TS 25.467. These small cells are intended to be able to be deployed alongside the more widely used macro-cellular network and support communications to UEs in a restricted, for example 'in-building', environment.

Herein, the term "small cell" means any cell having a small coverage area and includes "picocells" and "femtocells."

In a planned cellular network, a so-called neighbor cell list is used to identify adjacent cells to each cell, to facilitate handover of UE communications from a "source" cell to a "target" cell when the strength or quality of the signal from the serving (source) cell, for example, becomes too poor to maintain the communication. The neighbor cell list is broadcast to UEs to enable a UE to receive and assess the suitability of continuing a communication by transferring the communication to an adjacent (neighbor) cell. A neighbor cell list contains, inter alia, frequency and scrambling code information for all of the cells whose coverage area overlaps with the cell, to allow the UE to be able to receive and decode transmissions from the neighboring cells and send measurement reports back to the RNC. An Access Point and a node B may be provisioned with information about neighbor cells which may include frequency, scrambling code and a cell ID.

Handovers between macro cells, between small cells and between a macrocell and a small cell and between cells operating with different radio access technologies are all possible.

If it is assumed that a user equipment (UE) is participating in an active call, the UE receives the neighbor cell list in a radio resource control (RRC) message from the RNC via its serving node B. The UE measures the broadcast transmissions from cells in the list in order to identify the best (generally closest) neighboring cells to consider as potential target cells if the signal from its serving (source) cell should deteriorate in strength or quality.

There may be instances where a UE needs to make measurements on a different frequency (ie. non-co-channel) or on a different radio access technology vis a vis the source cell in order to identify a handover candidate. This can happen if there are no co-channel cells available to handover to, in which case, the UE must be forced to look for other candidate cells on other frequencies (inter-frequency) or other Radio Access Technologies (Inter-RAT). In such instances, the RNC issues an instruction to the UE to enter the so-called "compressed mode." In this mode, the RF synthesizers in the UE can be retuned temporarily to detect and measure non-co-channel frequencies. Typically, in compressed mode, transmission and reception are stopped for a short time and the measurements are performed on another frequency or RAT in that time, after which, transmission and reception resumes. If the UE has a second receiver then it can make measurements while still continuing with transmission and reception on the first receiver. Typically, a UE is not put into compressed mode until it reports a UE measurement indicating that the serving cell is getting weak (such as a UE measurement based on RSSI (received signal strength index), Ec/No ratio in the pilot channel (CPICH) or RSCP (received signal code power), for example. However, compressed mode has the disadvantage of using extra resources and may also adversely affect quality of service The UE then monitors specified neighbor cells, identified in a RRC measurement control message, until one of them meets the specified criteria (eg. signal strength or quality). Once one of the neighbor cells meets the specified criteria, the UE sends a Measurement Report to the RNC via its serving node B. Based on the information in the Measurement Report, the RNC determines whether to perform handover for the UE.

As mentioned above, handovers between a macrocell and a small cell are possible. The coverage area of a small cell may be typically just a few meters in radius. Consider an example where a small cell is served by a 3G AP located in a retail premises and the coverage of the small cell extends outside the premises into the roadway. A user of a UE, initially in a call supported by a macrocell, walking past the retail premises at approximately 5 km/h would take about 8 seconds to cover a 10 m range. It typically may take the UE 1-2 seconds to trigger a handover into the small cell once the coverage from the small cell was deemed better than the macrocell coverage. Whilst the small cell is the dominant carrier the call will proceed well. However, as the user walks towards the extremity of the small cell there may be a very short period of time (1-2 seconds) before the call drops if it is not handed back to the macrocell. Setting up a UE measurement on a small cell can take typically 1-2 seconds. Furthermore, the reliability of these messages when the UE has just handed over from the macrocell to the small cell (when it is between two cells) is not guaranteed under poor RF conditions and in 3G systems there are typically 3 sets of NCell measurement types to configure (InterFreq, Intra-Freq and InterRAT). Therefore, there may not be enough time for a handover back to the macrocell to be instigated and completed before the call is dropped from the small cell.

SUMMARY OF THE INVENTION

Aspects of the invention provide network elements, a wireless communication system and methods therefor as described in the appended claims.

According to a first aspect of invention there is provided a method for supporting a handover between cells in a wireless communication system, the method comprising; at a network element which supports communications in a first cell between a wireless communication unit and a core network; configuring a neighbour cell list, said list including identities of "problem" neighbour cells, receiving a request for handover of a wireless communication unit from a second, neighbouring cell into the first cell, determining if any Inter-Frequency or Inter-Radio Access Technology neighbour cells exist in the neighbour cell list, and if so, inspecting the neighbour cell list to determine whether the second cell is a problem neighbour cell, and if the second cell is identified as a problem cell, accepting the wireless communication unit into the first cell, and sending a measurement set up message to the wireless communication unit, said measurement set up message including a command to enter a compressed mode of operation, wherein a problem neighbour cell is classified as a cell for which a wireless communication unit, after being handed over therefrom into the first cell, requires handing over from the first cell to another cell before expiry of a predetermined time period.

Hence, on handing over from one cell to another, a user equipment may be immediately put into a compressed mode rather than waiting for the user equipment to require being put into this mode based on the user equipment reporting a drop in second (serving) cell signal strength as is conventionally the case In one example, the measurement set up message may also include an instruction to monitor intra-frequency neighbouring cells.

In the example, a further command to exit compressed mode may be issued to the wireless communication unit after a set period of time has elapsed.

The method may further include setting a timer running on accepting the wireless communication unit into the first cell from the second cell and detecting if a request for handover from the first cell to another cell is received prior to expiry of the timer.

In one embodiment, the method further comprises recording the identity of a cell to which a wireless communication unit was successfully handed over from the first cell.

The measurement set up message sent to the wireless communication unit may also include a priority order in which neighbouring cells are to be monitored, based on a recorded handover success rate.

The first cell may be a small cell and the second cell may be a macrocell.

The invention reduces the probability of a call dropping whilst on a small cell due to the lack of time available to set up and make the necessary measurements for handover back to a macrocell. Consequently, the call drop rate is reduced and the user experience is improved.

Once the UE has been on the small cell for a few seconds, then the UE may be taken out of compressed mode and allowed to operate as normal in order to reduce power levels and improve battery life According to a second aspect of the invention, there is provided a network element which supports communications in a first cell between a wireless communication unit and a core network and arranged to receive and accept a request for handover of a wireless communication unit from a second, neighbouring cell into the first cell, the network element comprising a store containing a neighbour cell list, said list identifying "problem" neighbour cells, and wherein the network element further comprises a signal processor arranged to determine from inspection of the neighbour cell list in the store, on receipt of a request for a handover of a wireless communication unit into the first cell from a second cell, whether any Inter-Frequency or Inter-RAT neighbour cells exist in the neighbour cell list and whether said second cell is a problem neighbour cell, and if so, to generate a measurement set up message which includes a command to enter a compressed mode of operation for transmitting to the wireless communication unit, wherein a problem neighbour cell is classified as a cell for which a wireless communication unit, after being handed over therefrom into the first cell, requires handing over from the first cell to another cell before expiry of a predetermined time period.

The signal processor may be further arranged to generate a command, for transmitting to the wireless communication unit, to exit the compressed mode of operation after a predetermined period of time has elapsed.

In a further example, the signal processor may be arranged to set a timer running on acceptance of the wireless communication unit into the first cell from the second cell and to detect if a request for handover from the first cell to another cell is received prior to expiry of the timer.

In another embodiment, the signal processor may be arranged to record the identity of a cell to which a wireless communication unit was successfully handed over from the first cell.

The signal processor may, optionally, be arranged to generate an order of priority, in which neighbouring cells are to be monitored based on a recorded handover success rate for each neighbouring cell, to be included in the measurement set up message.

The signal processor and store of the network element may be implemented in one or more integrated circuits.

According to a third aspect of the invention there is provided a wireless communication system arranged to support the method and network element of the above aspects.

According to a fourth aspect of the invention, there is provided tangible computer program product having an executable computer program code stored thereon for execution by a processor to perform a method in accordance with the first aspect.

The tangible computer program product may comprise at least one from a group consisting of: a hard disk, a CD-ROM, an optical storage device, a magnetic storage device, a Read Only Memory, a Programmable Read Only Memory, an Erasable Programmable Read Only Memory, an Electrically Erasable Programmable Read Only Memory and a Flash memory.

In one embodiment, the ordering of frequencies and scrambling codes within measurement set up messages which are sent to the User Equipment may be derived from statistical logs of recent handover successes recorded by an Access Point (or node B or other network subsystem) associated with a cell. Traditionally measurement setup messages are based simply upon the order they were typed into an OAM (Operation and Management) system, sorted by being based on 'best cell' as defined by the operator who has manually tuned the cell.

Optionally, the ordering of how measurement setup messages are sent to a UE may also be derived from a source cell-id which handed the UE into the target cell. The cell-id of the source cell may not be included explicitly in the Relocation Request message, but may be deduced from other information in the message, such as frequency and scrambling code in the included Measurement Report. Further, an Access Point or node B or RNC or other radio network subsystem may be arranged to derive a statistical likelihood of which cell is the best to hand back to (which may not necessarily be the original source cell).

In a further embodiment, the order in which neighbour cell measurement commands are sent to a UE may be dynamically assigned. A mechanism for such an assignment could be based on historical statistical data of handover successes to neighbour cells. In one example, setting up InterRAT before InterFreq is done for a particular location (because there are no known InterFreq cells, or those that exist are not likely to succeed based on recent historical data collected by an Access Point or other network subsystem).

These and other aspects, features and advantages of the invention will be apparent from, and elucidated with reference to, the embodiments described hereinafter.

BRIEF DESCRIPTION OF THE FIGURES

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

The inventive concept finds particular applicability in a cellular communication system that supports a number of overlapping communication coverage areas, for example a communication system that comprises a combination of small cells and macro cells. Further, the inventive concept finds applicability in a cellular communication system comprising more than one Radio Access Technology.

Those skilled in the art will recognize and appreciate that the specifics of the specific examples described are merely illustrative of some embodiments and that the teachings set forth herein are applicable in a variety of alternative settings. For example, since the inventive concepts do not depend on any particular combination of radio access technologies, it is envisaged that the inventive concepts can be applied to other combinations of RAT's although a combination of 2G systems and 3G systems are shown in the embodiments. As such, other alternative implementations within cellular communication systems conforming to different standards are contemplated and are within the scope of the various teachings described.

Figure 1:
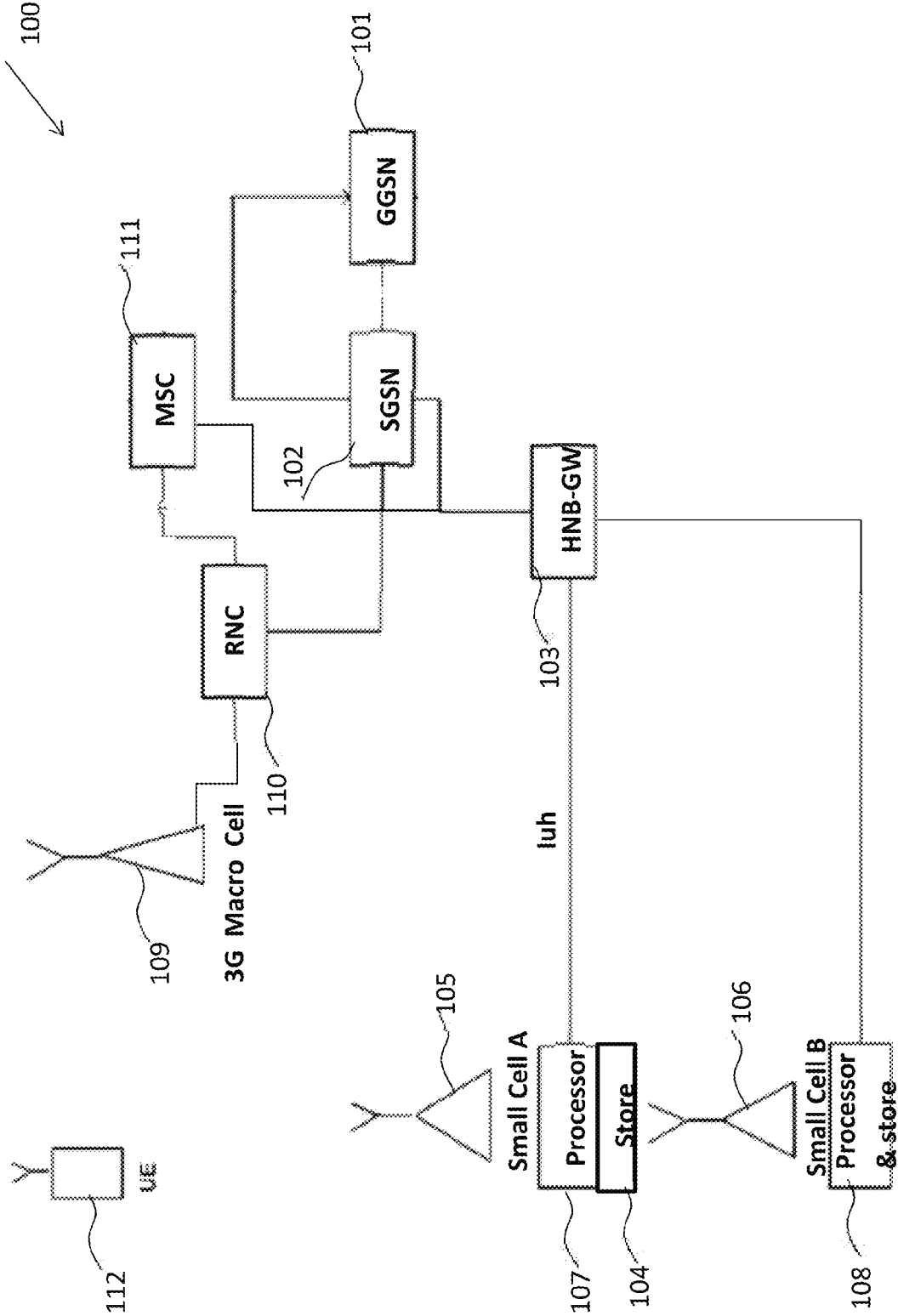
FIG. 1 illustrates a part of a cellular communication system operating in accordance with an example embodiment.

Referring now to FIG. 1, an example of part of a wireless communication system operating in accordance with embodiments of the invention is illustrated and indicated generally at 100 and comprises a UMTS (UTRAN) small cell (cell A), a UMTS (UTRAN) small cell (cell B) and a 3G macro cell (cell C)

A core network of the Wireless Communications System of FIG. 1 includes a Gateway General Packet Radio System (GPRS) Support Node (GGSN) 101 and a Serving GPRS Support Node (SGSN) 102. The GGSN 101 or SGSN 102 is responsible for interfacing the wireless communication system 100 with a packet data network, for example a Public Switched Data Network (PSDN), (such as the internet) or a Public Switched Telephone Network (PSTN). The SSGN 102 performs a routing and tunnelling function for traffic to and from the cells A, B and C while the GGSN 101 links with external packet networks. UMTS small cells A and B are linked to the SSGN 102 and to a Mobile Switching Centre (MSC) through a Home Node B Gateway (HNB-GW) 103. Each small cell A and B is served by an associated Access Point (AP) 105 and 106 respectively. The Access Point 105 is provided with a signal processing module 107 and a store 104 whose functionalities will be described below. The signal processing module 107 may be programmed by a computer program product such as a flash memory which is incorporated in the AP 105. The Access Point 106 is similarly provided with an associated signal processing module and store 108.

The 3G macro-cell C is served by a Node B 109 which is controlled by a Radio Network Controller (RNC) 110. The RNC 110 is linked to the SGSN 102 and to the Mobile Switching Centre 111.

A User Equipment 11 is able to move through the coverage areas of cells A, B and C and communicate with the core network via either AP 105 or 106 or node B 109. The coverage areas of cells A, B and C are shown schematically in FIG. 2.

Figure 2:
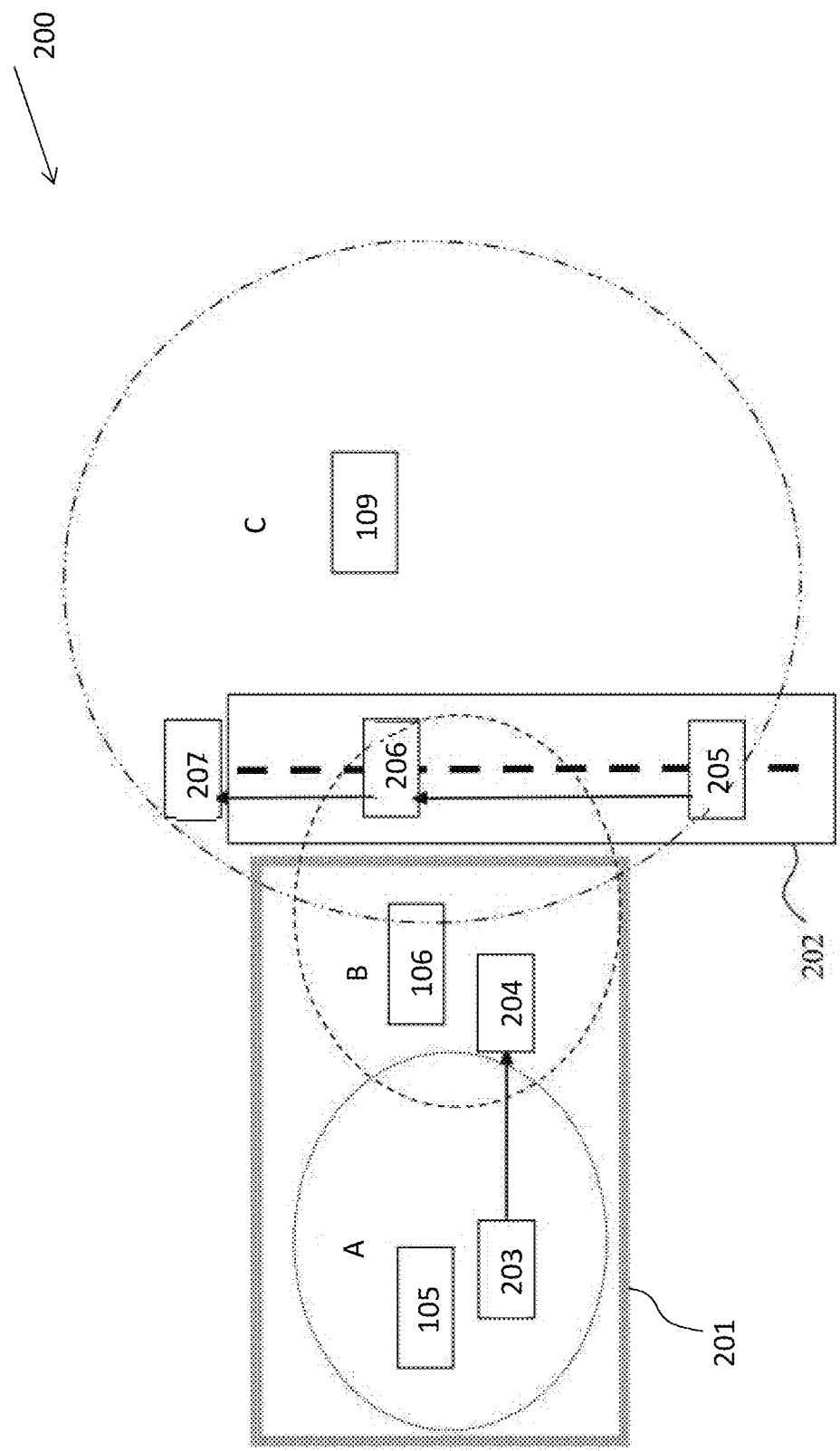
FIG. 2 illustrates an example of an arrangement of cells comprising the cellular communication system of FIG. 1.

In FIG. 2, small cells A and B provide wireless communication coverage inside a building 201. The Access Points 105 and 106 are disposed geographically within the building 201 so that the cells A and B are adjacent to one another and overlap by a small amount. Part of the coverage area of cell B strays outside of the building 201 to overlap with part of the area of coverage of macrocell C, served by node B 109. A roadway 202 runs through the region of overlap between cells B and C.

Each Access Point 105 and 106 and the node B 109 is provisioned with a neighbor cell list. Both Access Points 106 and 107 are in each other's neighbor cell list. In addition, each Access Point 105 and 106 is provisioned with a list of neighbor cells from which User Equipments have been observed to "hand in" (e.g. a handover from a source cell into cell A) and then after a relatively short time, say 1-2 seconds, subsequently handout (eg. handover from cell A back to the original source again). Such a neighbor cell will be referred to hereafter as a "problem cell."

In a first example, the UE 112 is in a call supported by Access Point 105 (i.e. the source cell is cell A) and located at position 203. While the call is in progress, the user of the UE 112 walks out of cell A and into cell B to position 204. Therefore, at some point, the UE 112 will have to handover from cell A (the source cell) to sell B (the target cell). In this case, once the Access Point 105 has identified the target cell as being small cell B, the signal processing module 107 associated with the Access Point 105 makes a check to determine if cell B is a "problem cell." In this case, cell B is not a problem cell as in general, movement between the two cells A and B will be relatively slow if the user has to negotiate office furniture and doorways for example. So in this example, the UE does not need to be forced into a compressed mode of operation and handover from source cell A to target cell B can proceed in a conventional manner.

In a second example, the UE 112 is in a call supported by macrocell C and moving in a vehicle along the roadway 202. The UE 112 moves from a position 205 which is solely in cell C's area of coverage to position 206 which is in the region of overlap between small cell B and macrocell C and thence to position 207 which is outside cell B but still within cell C. Say that the UE stops for a minute or two at position 206 at traffic lights. The UE 112 detects a stronger signal from cell B and so is handed over to that cell. However, cell C has been designated as a problem cell. This is because it has been observed (by the Access Point 106 for example) that User Equipments which are "handing in" from the cell very soon require a "hand out" again (within 1-2 second say). When the traffic lights change, the UE 112 will be quickly accelerated out of cell B's coverage area and will need to quickly handover back to cell C or else the call will be dropped. As the signal processing module 108 has identified cell C as a problem cell, it generates an instruction to the UE to enter "compressed mode" as soon as the UE is handed over from the macrocell C to cell B. On entering the compressed mode, the UE 112 immediately starts monitoring non-co-channel and inter-RAT cells. Hence, the UE is likely to identify cell C as a candidate target cell to hand back to before the UE passes out of coverage of cell B. Therefore, there is less risk of the call being dropped.

Figure 3A:
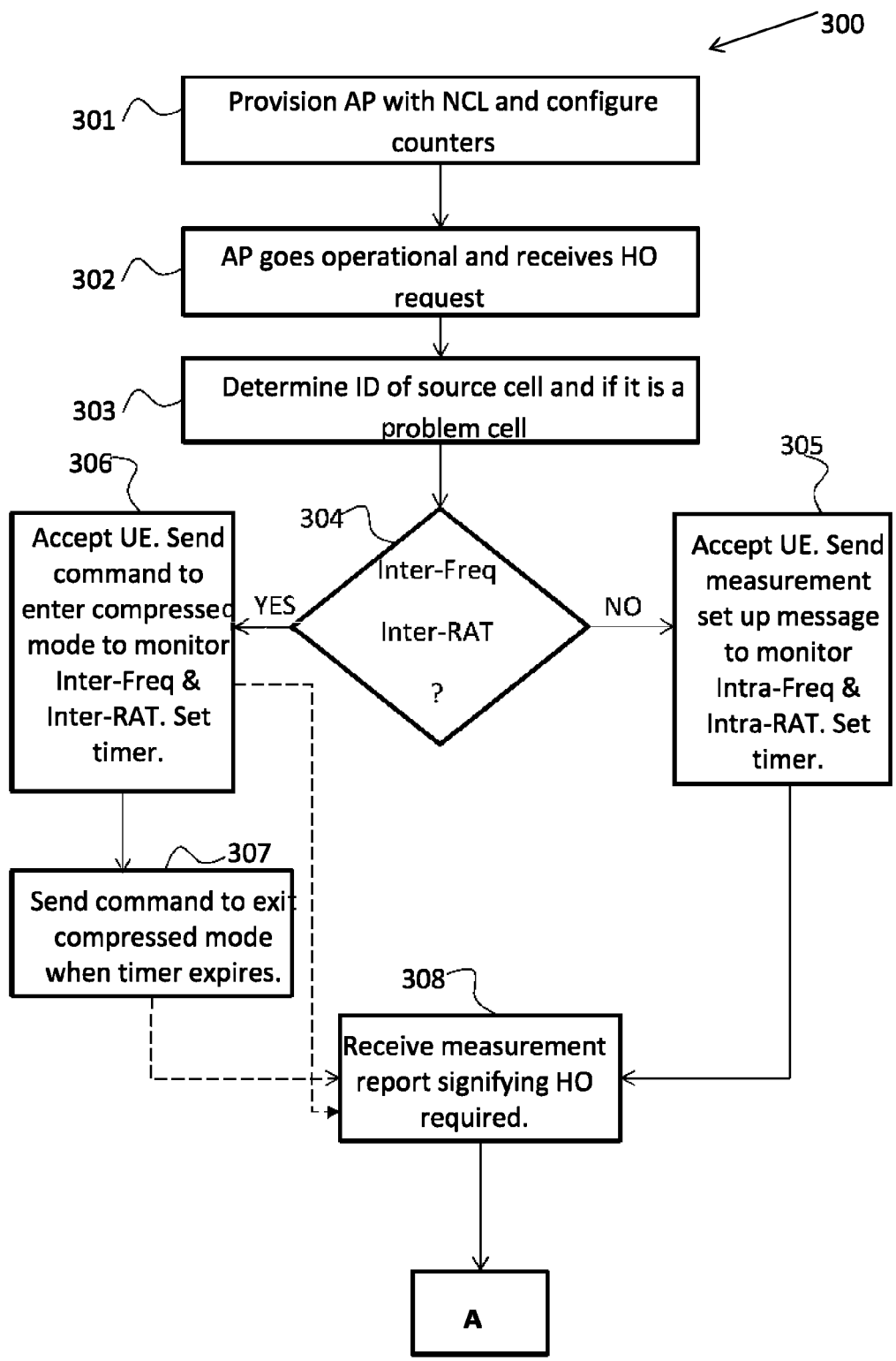
FIG. 3A and FIG. 3B are flow charts illustrating a method for handover of a UE between cells.
Figure 3B:
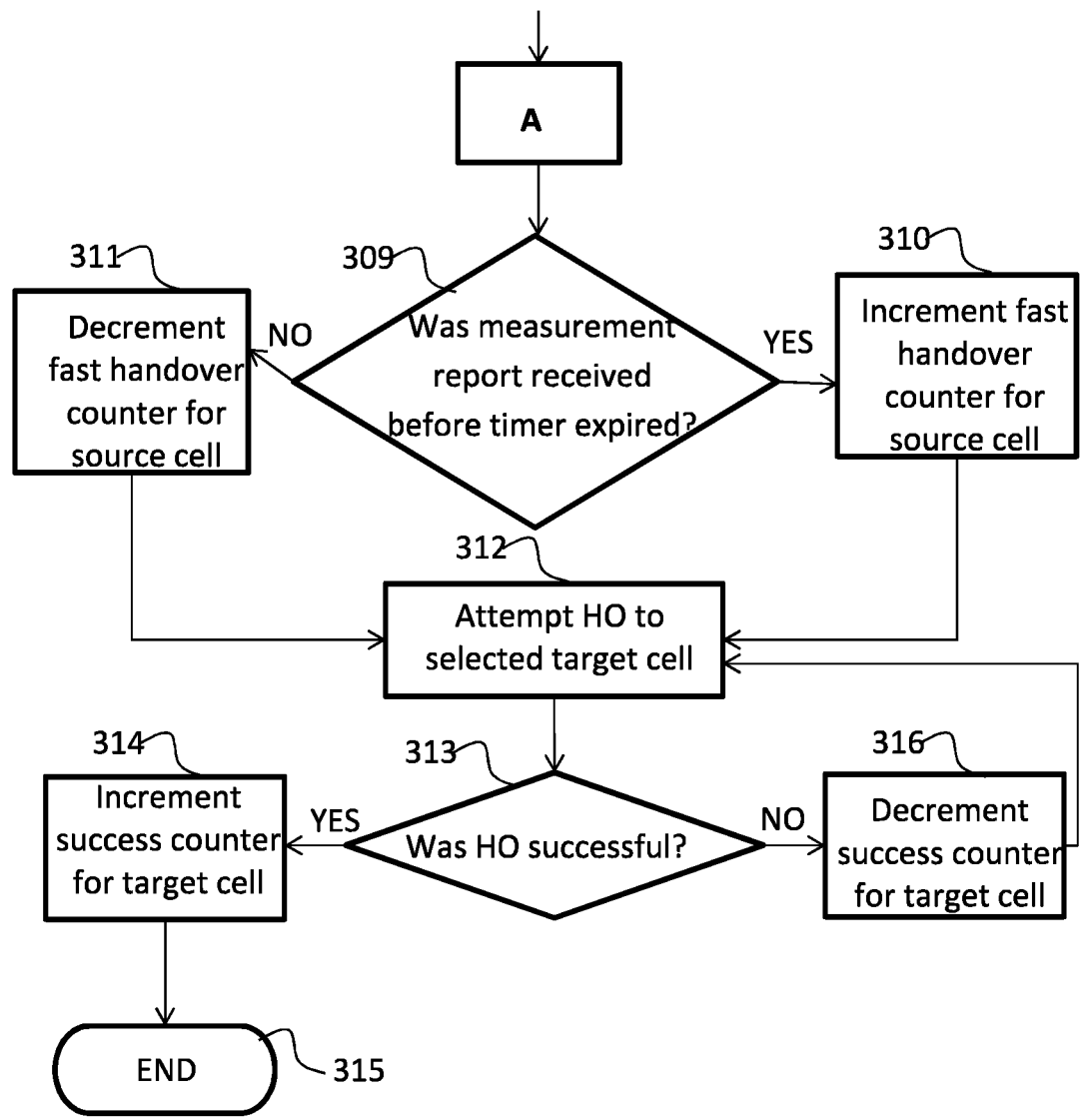

Referring now to the simplified flowchart of FIG. 3A and FIG. 3B, a method 300 of handing over between cells will now be described.

At 301, an Access Point (AP) (for example 105 or 106 of FIG. 2) is provisioned with a neighbor cell list (NCL) comprising the parameters of neighboring cells. For example, there may be three types of neighbor cells which are "Inter-Freq" "Intra-Freq" and Inter-RAT (e.g. 2G). Parameters typically include frequencies, scrambling codes, cell IDs and BSICs (Base Station Identity Codes) in the case of 2G cells. The neighbor cell list may come from a conventional provisioning system or by using the known technique of network listen scans which are made by the Access Point. An array of counters is also configured in the Access Point. Each neighbor cell in the list is assigned a "fast handover counter" and a "handover success counter." Each counter is set at an initial (integer) value, 10 say. Each counter may be incremented or decremented according to the outcome of certain events associated with handover processes. The fast handover counter may be used to identify neighbor cells which are "problem" cells. That is to say that a UE is "handed in" to such a cell and then "handed out" again very soon afterwards.

At 302 the Access Point goes operational and receives a handover (HO) request from the Core Network i.e. a UE currently in a call served by a neighboring (source) cell needs to be handed over to the Access Point which has been identified as a target cell.

At 303, the Access Point determines the source cell's ID. It can do this using the neighbor cell list and the frequency and scrambling code included in the handover request. It can determine if the source cell is a problem cell. It can determine this through inspection of the fast handover counter.

At 304, the Access Point checks its neighbor cell list to see if there are any Inter-Freq or Inter-RAT cells amongst its neighbors as potential target sells.

In the case where there are only Intra-Freq cells in the neighbor cell list, at 305, the Access Point accepts the UE by way of the handover process and sends the UE a measurement setup message so that it can immediately monitor potential Intra-Freq target sells for any subsequent handover. A timer is also set running at this point for a certain period, say 15 seconds.

In the case where there are Inter-Freq and/or Inter-RAT cells in the neighbor cell list, then at 306, the Access Point accepts the UE by way of the handover process and sends the UE a command to enter "compressed mode" so that Inter-Freq and Inter-RAT cells can be monitored by the UE as potential target sells for a subsequent handover. Also at this point, a timer is set for a certain period of time (15 seconds say)

At 307 when the timer has expired, the Access Point sends the UE a further command to exit the "compressed mode."

At 308, the Access Point receives a measurement report from the UE which indicates that the signals in the cell (served by the Access Point) have become too weak and at least one stronger neighbor cell has been detected. Therefore a handover is required. As the UE had been commanded to set up measurements as soon as it entered the cell supported by the Access Point, the risk of dropping the call whilst being served by the Access Point in the case where the UE quickly traverses its area of coverage is reduced.

At 309 it is determined, by the Access Point whether the measurement report received (at step 308) was received prior to expiry of the timer or not. If it was received before the timer expired, then the fast handover counter associated with the source cell is incremented, at 310 by 1 so its value becomes 11.

If on the other hand, the measurement report of step 308 was received after the timer expired, then the fast handover counter associated with the source cell is decremented, at 311, by 1 so that its value is now 9.

At 312, a target neighbor cell for handing over to is selected and an attempt is made to hand over the UE from the cell served by the AP to the identified target cell. The target neighbor cell may be selected according to one or more of several criteria. For example, a cell may be selected on the basis of the best quality signal. As another example, it may be selected on the basis that it has a high success rate for handovers from the cell served by the Access Point. The selection process may be performed by the Access Point.

At 313 it is determined whether or not the handover attempt was successful. If the handover from the cell served by the Access Point to the target cell selected by the Access Point was successful, then at 314, the handover success counter for the target cell is incremented by 1 so that its value is now 11. The process then ends at 315.

If, on the other hand, the handover was unsuccessful, then at 316, the handover success counter for the target cell is decremented by 1, so that its value is now 9. The process may revert to step 312 where another target cell may be selected for handover. The following steps may be repeated until a successful handover is achieved or the call is dropped.

It may be that multiple cells are better than the serving cell in the UE measurement report received at step 308. Then the Access Point can make a selection either upon signal strength or signal quality or use the handover success counters to pick the best cell. This is so that if the target cell often fails to successfully complete a handover from the Access Point (e.g. because it is congested or the RF conditions degrade quickly again so as to not support a handover) this cell is not repeatedly used when it is a "bad" cell to handover to; ie. its success counter has a comparatively low value. The time taken to fail a handover in small cell environments may take 1-2 seconds and this may constitute a significant proportion of the time the UE may spend in the cell before it moves out again.

The signal processing functionality of the embodiments of the invention, particularly the signal processing modules 107 and 108 may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' 'non-transitory computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for supporting a handover between cells in a wireless communication system, the method comprising
at a network element that supports communications in a first cell (B) between a wireless communication unit and a core network:
configuring a neighbour cell list, said list including identities of "problem" neighbour cells, receiving a request for handover of a wireless communication unit from a second, neighbouring cell (C) into the first cell (B);
determining whether any Inter-Frequency or Inter-Radio Access Technology neighbour cells exist in the neighbour cell list and, in response to determining that an Inter-Frequency or Inter-Radio Access Technology neighbour cells exists in the neighbour cell list, inspecting the neighbour cell list to determine whether the second cell is a problem neighbour cell, and, in response to determining that the second cell is identified as a problem cell, accepting the wireless communication unit into the first cell; and
sending a measurement set up message to the wireless communication unit, said set up message including a command to enter a compressed mode of operation, wherein a problem neighbour cell is classified as a cell for which a wireless communication unit, after being handed over therefrom into the first cell, requires handing over from the first cell to another cell before expiry of a predetermined time period.

2. The method of claim 1, wherein a further command to exit the compressed mode of operation is issued to the wireless communication unit after a set period of time has elapsed.

3. The method of claim 1, including setting a timer running on accepting the wireless communication unit into the first cell (B) from the second cell (C) and detecting whether a request for handover from the first cell to another cell is received prior to expiry of the timer.

4. The method of claim 1, comprising recording an identity of a cell to which a wireless communication unit was successfully handed over from the first cell (B).

5. The method of claim 1, wherein the measurement set up message sent to the wireless communication unit includes a priority order in which neighbouring cells are to be monitored, based on a recorded handover success rate.

6. A network element which supports communications in a first cell (B) between a wireless communication unit and a core network and arranged to receive and accept a request for handover of a wireless communication unit from a second, neighbouring cell (C) into the first cell (B), the network element comprising:
    a store containing a neighbour cell list, said list including identities of "problem" neighbour cells, and
    a signal processor coupled to the store and configured to determine from inspection of the neighbour cell list in the store, on receipt of a request for a handover of a wireless communication unit into the first cell from a second cell, whether any Inter-Frequency or Inter-Radio Access Technology neighbour cells exist in the neighbour cell list and whether said second cell is a problem neighbour cell, and, in response to determining that an Inter-Frequency or Inter-Radio Access Technology neighbour cell exists in the neighbour cell list and that said second cell is a problem neighbour cell, to generate a measurement set up message which includes a command to enter a compressed mode of operation for transmitting to the wireless communication unit, wherein a problem neighbour cell is classified as a cell for which a wireless communication unit, after being handed over therefrom into the first cell, requires handing over from the first cell to another cell before the expiry of a predetermined time period.

7. The network element of claim 6, wherein the signal processor is arranged to generate a command, for transmitting to the wireless communication unit, to exit the compressed mode of operation after a predetermined period of time has elapsed.

8. The network element of claim 6, wherein the signal processor is arranged to set a timer running on acceptance of the wireless communication unit into the first cell (B) from the second cell (C) and to record whether a request for handover from the first cell to another cell is received prior to expiry of the timer.

9. The network element claim 6, wherein the signal processor is arranged to record the identity of a cell to which a wireless communication unit was successfully handed over from the first cell (B).

10. The network element of claim 6, wherein the signal processor is arranged to generate an order of priority, in which neighbouring cells are to be monitored based on a recorded handover success rate for each neighbouring cell, to be included in the measurement set up message.

11. The network element of claim 6, wherein the signal processor and store are implemented in one or more integrated circuits.

12. A non-transitory computer readable medium having computer readable instructions stored thereon for execution by a processor to
    provide a network element that supports communications in a first cell (B) between a wireless communication unit and a core network;
    configure a neighbour cell list, said list including identities of "problem" neighbour cells, receiving a request for handover of a wireless communication unit from a second, neighbouring cell (C) into the first cell (B);
    determine whether any Inter-Frequency or Inter-Radio Access Technology neighbour cells exist in the neighbour cell list and, in response to determining that an Inter-Frequency or Inter-Radio Access Technology neighbour cells exists in the neighbour cell list, inspect the neighbour cell list to determine whether the second cell is a problem neighbour cell, and, in response to determining that the second cell is identified as a problem cell, accepting the wireless communication unit into the first cell; and
    send a measurement set up message to the wireless communication unit, said set up message including a command to enter a compressed mode of operation, wherein a problem neighbour cell is classified as a cell for which a wireless communication unit, after being handed over therefrom into the first cell, requires handing over from the first cell to another cell before expiry of a predetermined time period.

13. A non-transitory computer readable medium of claim 12, comprising at least one from a group consisting of: a hard disk, a CD-ROM, an optical storage device, a magnetic storage device, a Read Only Memory, a Programmable Read Only Memory, an Erasable Programmable Read Only Memory, an Electrically Erasable Programmable Read Only Memory and a Flash memory.

* * * * *